(12) United States Patent
Guha et al.

(10) Patent No.: US 11,126,493 B2
(45) Date of Patent: Sep. 21, 2021

(54) METHODS AND SYSTEMS FOR AUTONOMOUS CLOUD APPLICATION OPERATIONS

(71) Applicants: Aloke Guha, Louisville, CO (US); Shridhar Venkatraman, Campbell, CA (US)

(72) Inventors: Aloke Guha, Louisville, CO (US); Shridhar Venkatraman, Campbell, CA (US)

(*) Notice: Subject to any disclaimer, the term of this patent is extended or adjusted under 35 U.S.C. 154(b) by 0 days.

(21) Appl. No.: 16/693,343

(22) Filed: Nov. 24, 2019

(65) Prior Publication Data
US 2020/0371857 A1 Nov. 26, 2020

Related U.S. Application Data

(60) Provisional application No. 62/771,163, filed on Nov. 25, 2018, provisional application No. 62/939,663, filed on Nov. 24, 2019.

(51) Int. Cl.
*G06F 11/00* (2006.01)
*G06F 11/07* (2006.01)
(Continued)

(52) U.S. Cl.
CPC .......... *G06F 11/079* (2013.01); *G06F 9/5072* (2013.01); *G06F 11/0772* (2013.01);
(Continued)

(58) Field of Classification Search
CPC ............... G06F 11/079; G06F 11/0793; G06F 11/3006; G06N 20/00
See application file for complete search history.

(56) References Cited

U.S. PATENT DOCUMENTS

| 7,996,814 B1 * | 8/2011 | Qureshi | G06F 11/079 717/120 |
| 10,503,580 B2 * | 12/2019 | Musuvathi | G06N 20/00 |

(Continued)

OTHER PUBLICATIONS

2019 Revised Patent Subject Matter Eligibility Guidance Appendix 1 pp. 30-41 (Year: 2019).*

*Primary Examiner* — Jonathan D Gibson

(57) ABSTRACT

In one aspect, a computerized method for managing autonomous cloud application operations includes the step of providing a cloud-based application. The method includes the step of implementing a discovery phase on the cloud-based application. The discovery phase comprises ingesting data from the cloud-based application and building an application graph of the cloud-based application. The application graph represents a structural topology and a set of directional dependencies within and across the layers of the cloud-based application. The method includes the step of, with the application graph, implementing anomaly detection on the cloud-based application by building a set of predictive behavior models from a predictive understanding of the complete application using a priori curated knowledge and one or more machine learning (ML) models. The set of predictive behavior models fingerprints a behavior of the cloud-based application behavior. The method predicts expected values of key indicators. The method detects one or more anomalies in the cloud-based application. The method includes the step of implementing causal analysis of the one or more detected anomalies. The causal analysis includes receiving a set of relevant labels and a set of metadata related to the one or more detected anomalies, and the structure of the application graph. The method generates a causal analysis information. The method includes the step of implementing problem classification by classifying the one or more anomalies and causal analysis information into a (Continued)

taxonomy. The taxonomy includes a set of details on the nature of the problem and a set of remediation actions.

14 Claims, 10 Drawing Sheets

(51) Int. Cl.
*G06N 20/00* (2019.01)
*G06F 9/50* (2006.01)
*G06K 9/62* (2006.01)
*G06F 11/30* (2006.01)

(52) U.S. Cl.
CPC ...... *G06F 11/0793* (2013.01); *G06F 11/3006* (2013.01); *G06K 9/626* (2013.01); *G06N 20/00* (2019.01)

(56) References Cited

U.S. PATENT DOCUMENTS

| | | | | |
|---|---|---|---|---|
| 10,599,506 | B2* | 3/2020 | Cohen | G06F 11/3072 |
| 10,877,867 | B1* | 12/2020 | Campbell | G06F 11/327 |
| 10,922,163 | B2* | 2/2021 | Spencer | G06F 11/079 |
| 2014/0372347 | A1* | 12/2014 | Cohen | G06N 20/00 |
| | | | | 706/12 |
| 2016/0057041 | A1* | 2/2016 | Gupta | H04L 41/5025 |
| | | | | 706/12 |
| 2018/0309770 | A1* | 10/2018 | Han | G06F 11/0712 |
| 2018/0365093 | A1* | 12/2018 | Musuvathi | G06F 11/3447 |
| 2019/0095265 | A1* | 3/2019 | Dome | H04L 41/147 |
| 2020/0014581 | A1* | 1/2020 | Aaron | H04L 12/28 |
| 2020/0034224 | A1* | 1/2020 | Nagendra | G06F 11/0793 |
| 2020/0142763 | A1* | 5/2020 | Yang | G06F 11/0769 |
| 2020/0151042 | A1* | 5/2020 | Spencer | G06F 11/0751 |
| 2020/0348662 | A1* | 11/2020 | Cella | G05B 23/024 |
| 2020/0371857 | A1* | 11/2020 | Guha | G06F 9/5072 |

\* cited by examiner

METHODS AND SYSTEMS FOR AUTONOMOUS CLOUD APPLICATION OPERATIONS

CLAIM OF PRIORITY

This application claims priority to U.S. Provisional Application No. 62/771,163, titled METHODS AND SYSTEMS FOR AUTONOMOUS CLOUD APPLICATION OPERATIONS, and filed on 25 Nov. 2018. This application is incorporated herein by reference.

This application claims priority to U.S. Provisional Application No. 62/939,663, titled METHODS AND SYSTEMS FOR AUTONOMOUS CLOUD APPLICATION OPERATIONS, and filed on 24 Nov. 2019. This application is incorporated herein by reference.

BACKGROUND

FIG. 1 illustrates an example modern application environment 100. An application environment can include, inter alia: an application layer 102, an orchestration/Kubernetes layer 104, and a cloud/other infrastructure layer 106. Containers (and/or various microservices) can be implemented in application environment 100.

Application container technology is revolutionizing application development. Containers can provide flexibility and efficiency to the development process. And to help manage those containers for rapid continuous integration, deployment and high availability, organizations are embracing orchestration platforms (e.g. Kubernetes, etc.).

Containers introduce several layers of abstraction between the application and the underlying hardware to ensure portability and scalability. This can contribute to a significant blind spot when it comes to conventional monitoring. Accordingly, there is an increased need to document and record the interdependent components containers across the various layers of the application environment.

The increased documentation and recordation leads to an increased importance for visualization of the information. However, the scale and complexity introduced by containers and container orchestration requires the ability to both visualize the environment to gain insight into the application and the underlying infrastructure health. There is also a need to be able to zoom in and view the health and performance of containers, node and pods. Improvements are also desired for enabling a DevOps team to track how application performance is impacted across deployments.

BRIEF SUMMARY OF THE INVENTION

In one aspect, a computerized method for managing autonomous cloud application operations includes the step of providing a cloud-based application. The method includes the step of implementing a discovery phase on the cloud-based application. The discovery phase comprises ingesting data from the cloud-based application and building an application graph of the cloud-based application. The application graph represents a structural topology and a set of directional dependencies and relationships within and across the layers of the cloud-based application. The method includes the step of, with the application graph, implementing anomaly detection on the cloud-based application by building a set of predictive behavior models from a understanding of the complete application using a priori curated knowledge and one or more machine learning (ML) models. The set of predictive behavior models fingerprints a behavior of the cloud-based application behavior. The method predicts expected values of key indicators. The method detects one or more anomalies in the cloud-based application. The method includes the step of implementing causal analysis of the one or more detected anomalies. The causal analysis includes receiving a set of relevant labels and a set of metadata related to the one or more detected anomalies, and the structure of the application graph. The method generates a causal analysis information and fault isolation. The method includes the step of implementing problem classification by classifying the one or more anomalies and causal analysis information into a taxonomy. The taxonomy includes a set of details on the nature of the problem and a set of remediation actions. The method includes the step of implementing the remediation actions to change the behavior of one or more components to restore the performance service levels of the application using the information related to the one or more anomalies, the causal analysis information as related to the taxonomy, and the control action information associated with the anomaly within the taxonomy.

Figure 1:
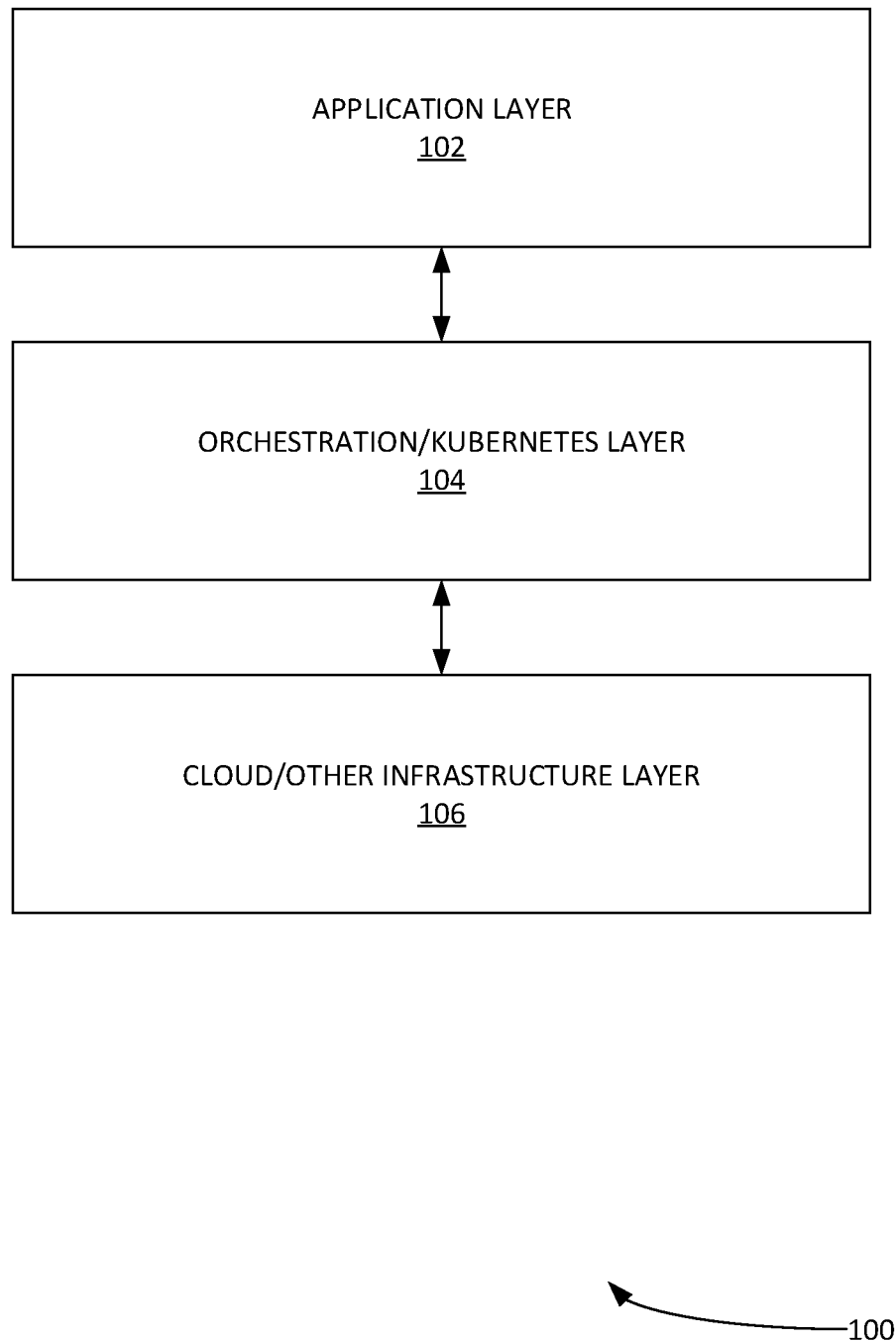
FIG. 1 illustrates an example process for implementing autonomous cloud application operations, according to some embodiments.

The Figures described above are a representative set and are not exhaustive with respect to embodying the invention.

DESCRIPTION

Disclosed are a system, method, and article of autonomous cloud application operations. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Apache Kafka (Kafka herein) is an open source message broker project developed by the Apache Software Foundation.

Application programming interface (API) can specify how software components of various systems interact with each other.

Canonical-correlation analysis (CCA) is a way of inferring information from cross-covariance matrices.

Cloud computing can involve deploying groups of remote servers and/or software networks that allow centralized data storage and online access to computer services or resources. These groups of remote serves and/or software networks can be a collection of remote computing services.

Cluster analysis or clustering is the task of grouping a set of objects in such a way that objects in the same group (e.g., a cluster) are more similar to each other than to those in other groups (e.g. clusters).

Container can be an isolated user-space instances enable by an OS-level virtualization. A kernel can enable the existence of such multiple isolated user-space instances.

DevOps is a software development methodology that combines software development (Dev) with information technology operations (Ops). DevOps can shorten the systems development life cycle while also delivering features, fixes, and updates frequently in close alignment with business objectives.

Elasticsearch is a search engine based on the Lucene library.

Granger causality test is a statistical hypothesis test for determining whether one time series is useful in forecasting another.

Infrastructure map is the infrastructure and/or resource related map.

JanusGraph is an open source, distributed graph database. It is noted that another type of distributed graph database can be utilized in lieu of JanusGraphs in various embodiments.

Kubernetes is an open-source container-orchestration system for automating application deployment, scaling, and/or management.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Orchestration Map can be the map or structure of the orchestrated, e.g., by Kubernetes, container pods, etc.

Site Reliability Engineering (SRE) includes various on-call support and utilizes aspects of software engineering and applies them to infrastructure and operations problems. SRE can be used to create scalable and highly reliable software systems.

Software as a service (SaaS) is a software licensing and delivery model in which software is licensed on a subscription basis and is centrally hosted.

Tree traversal is a form of graph traversal and refers to the process of visiting (e.g. checking and/or updating) each node in a tree data structure.

Exemplary Methods

Methods of autonomous cloud-based application operations are provided. The method can address the challenge of managing application performance by providing a DevOps team an autonomous dynamic performance assurance platform. The method comprises two parts. A first part includes obtaining actionable insights. Actionable insights can provide automated granular visibility into where and why performance problems are occurring. Actionable insights can enable direct pinpoint intervention.

The second part includes providing prescriptive tuning to restore application service levels with automation, assisting the decision and control. The method can consume existing monitoring, event and configuration data to automatically build a real-time application-wide model using a unique patent-pending application-centric approach. This model can be built using curated application knowledge augmented by multiple machine learning techniques. The method provides a deep granular understanding of the application behavior of all underlying components and their interdependencies, across the application and down to the infrastructure level. Using this model in a predictive mode, the method provides continuous application performance insights. The method can also be used to detect early onset of problems, isolating the cause and locality of the problem and recommending corrective actions.

Figure 2:
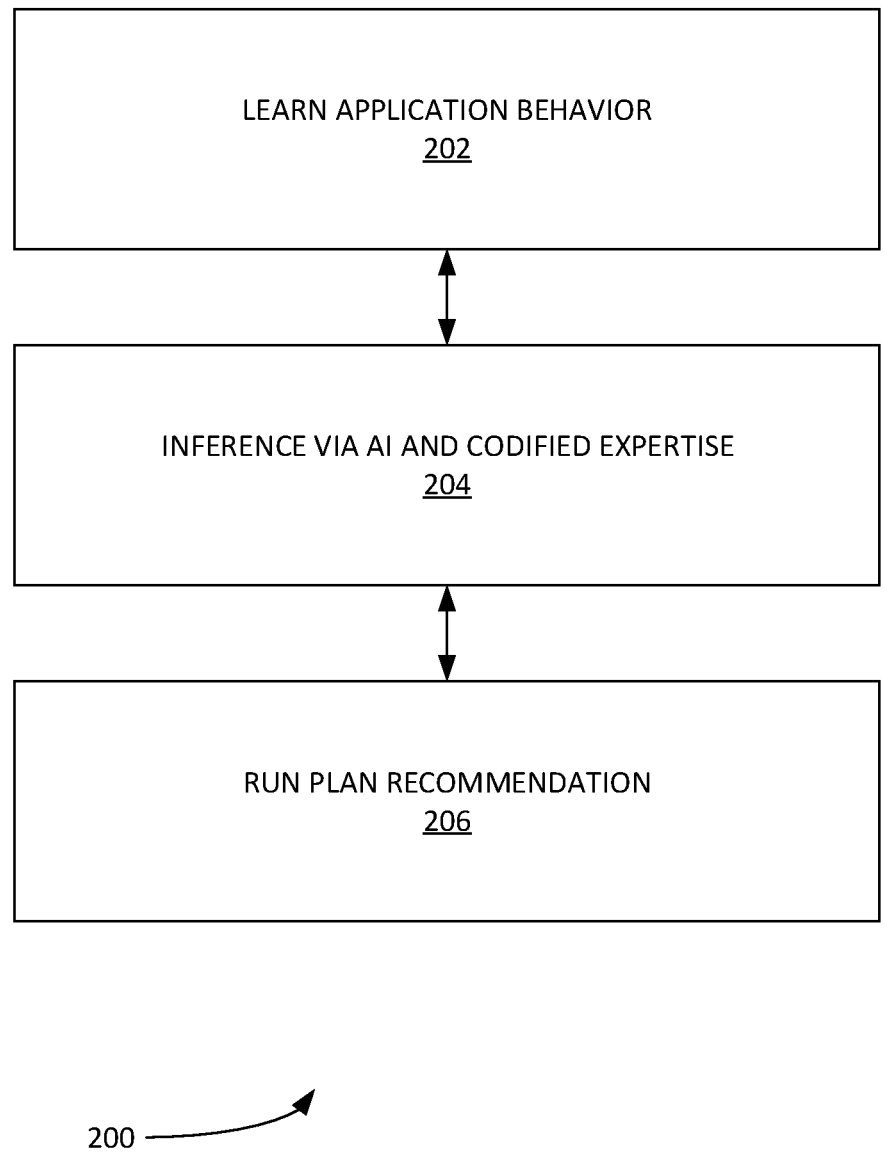
FIG. 2 illustrates an example process for implementing autonomous cloud application operations, according to some embodiments.

FIG. 2 illustrates an example process 200 for implementing autonomous cloud application operations, according to some embodiments. Process 200 can provide actionable insights. Process 200 can provide a granular view of events and can fix a probable problem (e.g., a sequence of steps that include 'what went wrong', 'where fix needs to be made', recommendation for tuning, etc.). Process 200 can be utilized for prescriptive tuning and/or recommendations. Process 200 can provide a prescriptive plan to DevOps to meet performance targets. Process 200 leverage ML to optimize this recommendation process. In this way, process 200 can be used to assure application performance.

In step 202, process 200 can learn application behavior.

Figure 3:
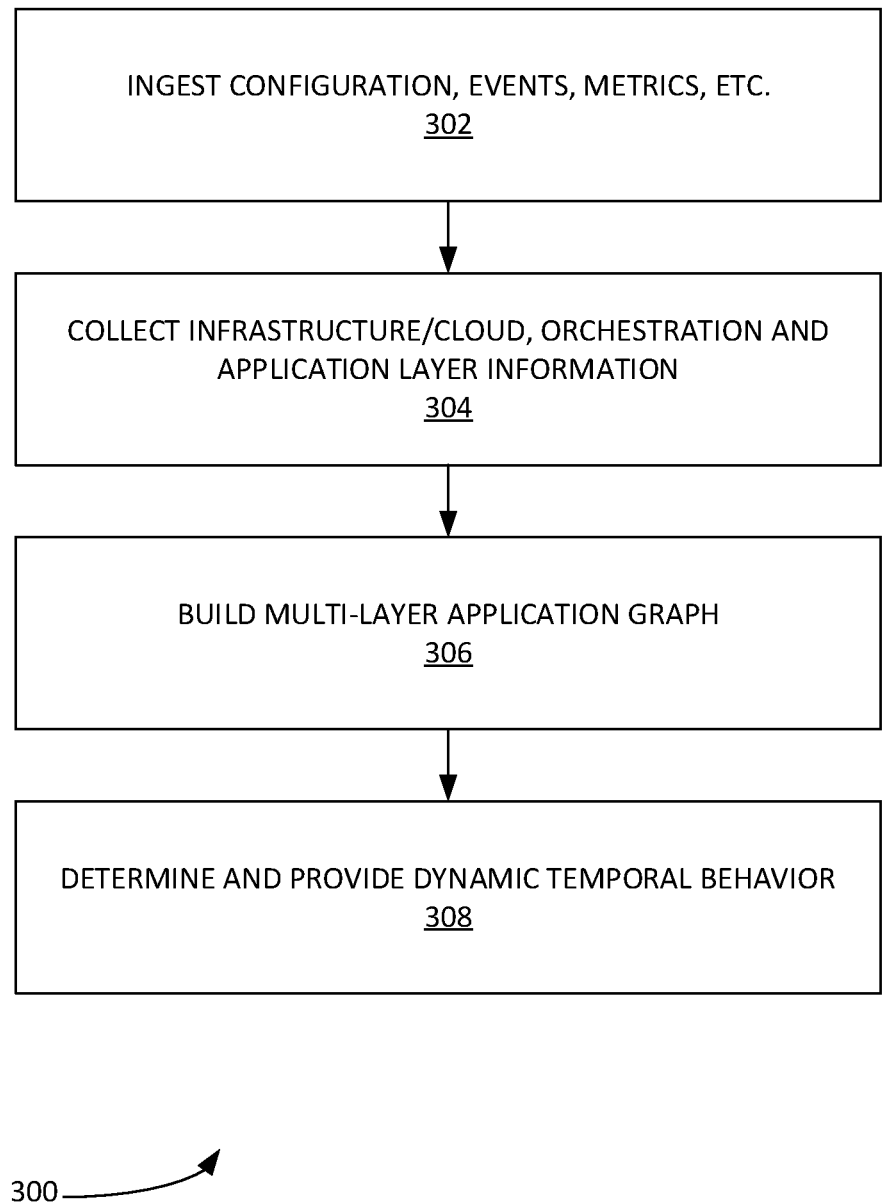
FIG. 3 illustrates an example process for learning application behavior, according to some embodiments.

FIG. 3 illustrates an example process 300 for learning application behavior, according to some embodiments. In step 302, process 300 can ingest the application's configuration, events, metrics, etc. In step 304, process 300 can collect infrastructure/cloud, orchestration and/or application layer information.

In step 306, process 300 can build multi-layer application graph. The multi-layer application graph be used to generate a map display. The multi-layer application graph can include the connections of every container and its relationship to its various dependencies, etc. The multi-layer application graph (e.g. the application map) can be a topology of the application across the three layers 102-106. As data comes in and using the metrics obtained, process 300 can enrich the data corresponding to the level and node of the multi-layer application graph map to which the data belongs. A user can look at data as presented by the map generated from the multi-layer application graph and know how to categorize data according its service and node the multilayer map. Process 300 can build a model of every component of the application vis-a-vis every container and/or microservice that comprises the application.

Process 300 can use the multi-layer application graph to build a dynamic temporal model. The dynamic temporal model can include how the applications implements requests and inputs. The dynamic temporal model can include how the respective container or microservice responds. The dynamic temporal model can be a fingerprint the application. Process 300 can break down over application by modeling the behavior vis-a-vis fingerprinting every one of its components. Process 300 can determine the connectivity of the application at a specified time. Process 300 can determine the state of the application's components as well. Accordingly, for any service, degradation, configuration issue, process 300 can determine that there is a dependency or specific error then can be used to detect an anomaly.

In step 308, process 300 can determine and provide dynamic temporal behavior. This information can be provided to step 204.

In step 204, process 200 can implement inference via AI and codified expertise. For example, process 200 can analyze the anomaly using a known structure (e.g. an application model) and then run a causal analysis to narrow down to the cause of the anomaly and/or fault isolation. Causal analysis can be graph causal analysis. This can encompass both game tree approach, as well as, Granger causality. The known structure of the application model can be based on prior knowledge of application behavior and/or application structure of each service. Process 200 can include application components and/or crowd sourced rules (e.g. based on expert knowledge). Process 200 can review resources and determine the cause of the failure. A subject matter expert can review and analyze. Process 200 then identifies an offending root cause and then uses the application model plus curated knowledge to determine other related issues. Process 200 uses the application model and curated knowledge to establish an existing problem, classify said problem, learn new problems, and/or create a taxonomy of problems.

In step 206, process 200 can run a plan recommendation. For example, process 200 can then make the change (e.g. can be scripted, recommend and provide to operations, etc.).

Figure 4:
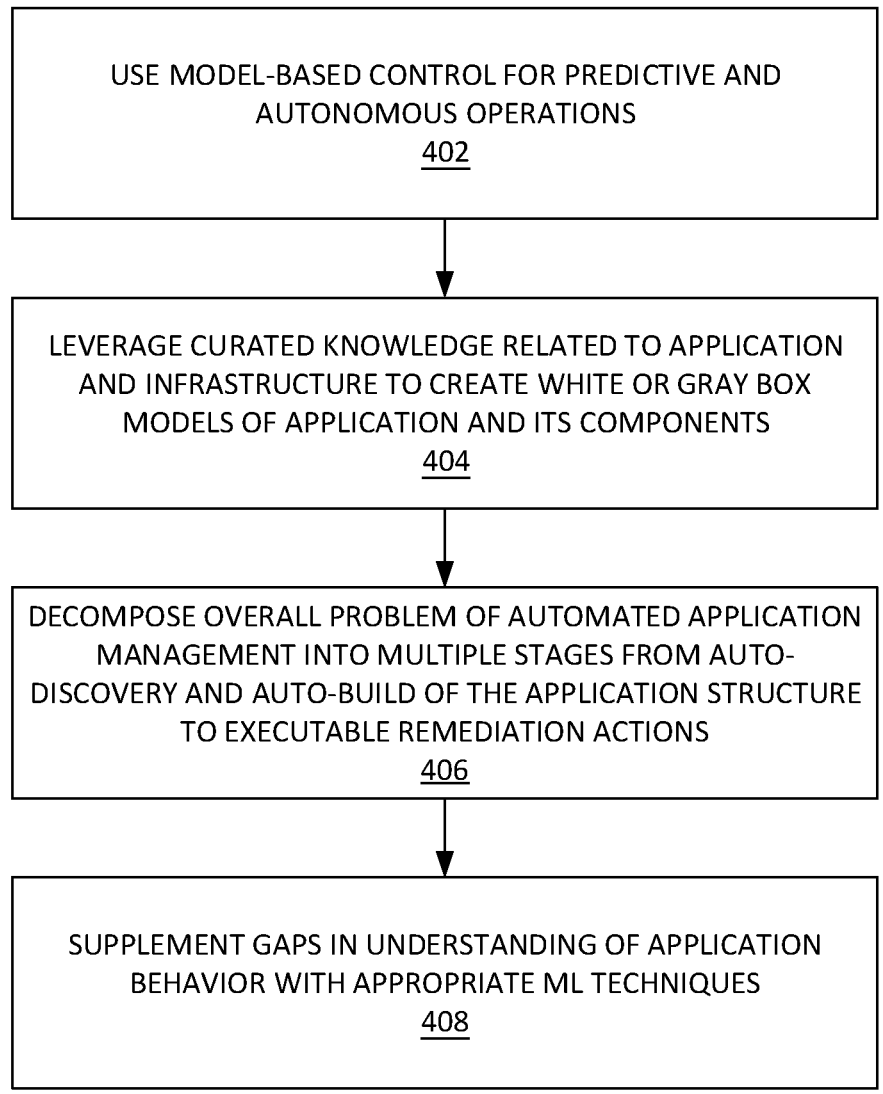
FIG. 4 illustrates an example process for actionable platform to continuously manage their containerized applications per service levels, according to some embodiments.

FIG. 4 illustrates an example process 400 for actionable platform to continuously manage their applications per service levels, according to some embodiments. Process 400 can use a SaaS is designed from the ground up to provide DevOps and/or SRE teams an actionable platform to continuously manage their containerized applications per service levels. Process 400 uses a model-driven control system that embeds curated knowledge to provide more context and fill in the missing information using appropriate ML techniques (e.g. see infra). Process 400 can be used to manage controls for SaaS and other microservices, that are not containerized, as well as, containerized applications.

Process 400 can build on step 402 as guiding principles to design and build the actionable platform for managing deployed applications. In step 402, process 400 can use a model-based control for predictive and autonomous operations (e.g. see step 202 supra). In step 404, process 400 can leverage curated knowledge related to the application and the infrastructure to create white or gray box models of the application and its components (e.g. see 204 supra). In step 404, process 400 discovers/understands the structure of the application. Process 400 discovers/understands the structure and topology of the distributed nature of the application (e.g. microservice based application).

In step 406, process 400 can decompose the overall problem of automated application management into multiple stages from auto-discovery and auto-build of the application structure to executable remediation actions. In step 408, process 400 can supplement gaps in understanding of application behavior with appropriate ML techniques. It is noted that process 400 can use multiple open sources of data and accessible third-party sources for metrics, events, configurations, as well as operator input.

Figure 5:
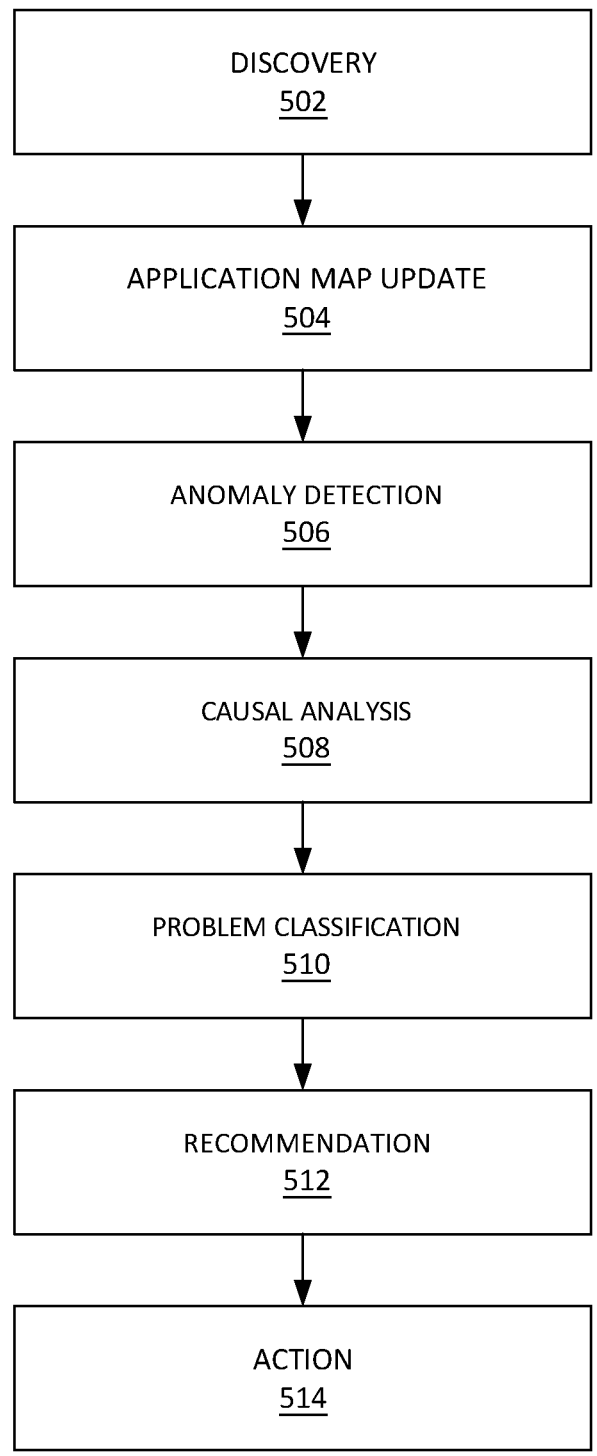
FIG. 5 illustrates an example process for multi-stage pipelined analysis, according to some embodiments.

FIG. 5 illustrates an example process 500 for multi-stage pipelined analysis, according to some embodiments.

In step 502, process 500 can implement a discovery phase. The discovery phase can include ingesting data and building application graphs. In this step, process 500 maps all data collected from the south side into normalized form to build a multi-layer graph application graph (e.g. an application graph as used herein) from configuration, metrics and network data. It is noted that the application graph represents the structural topology and directional dependencies across all three layers: the application layer 102, the orchestration (e.g. Kubernetes) layer 104, and the infrastructure (cloud) layer 106. In this way, process 500 generates a normalized representation of the application map into vertices and edges.

In step 504, implement application map update(s). For example, process 500 can provide real-time updates of application graph. Process 800 can enrich and update the application graph with the most recent metrics and event data for each entity across all three layers. This provides the most recent known state of the application and its infrastructure. Process 500 can also provide rules to associate metrics and properties for vertices and edges from stream data. Process 500 can also process Kubernetes configurations and event data. Process 500 can extract direction information from network flow. Process 500 can optimize metric ingestion in controller, or the north-side component. The north-side component can be the controller that uses the data collected and then processes it for the steps in 500. Process 500 can also push this information to a specified time-series DB (e.g. Chronix®). Process 500 can then create and update graph (e.g. a JanusGraph®, etc.).

In step 506, process 500 can implement anomaly detection. In some embodiments, to implement anomaly detection, process 500 can build predictive behavior models and detect anomalies. Process 500 builds a predictive understanding of the complete application using a priori curated knowledge, as well as, a multiplicity of ML techniques. The model fingerprints the application behavior, and predicts expected values of key indicators, 'influencer metrics', or the performance metrics based on the demand. The influencer metrics can be primary indicators of the health of the applications and are shown in the application map.

In step 506, a known application registry can be generated and maintained. It is noted that various applications can use a number of commonly known components (e.g. Kafka® or ElasticSearch®, etc.). In one example, process 500 can use a factory-process to model known components to create offline behavior model templates. The model template can then be updated in runtime to reflect the behavior in the operating environment. Additionally, after an anomaly is detected, the application model can be used in an interpretive mode to determine which specific influencer metrics might have caused the anomaly.

Figure 7:
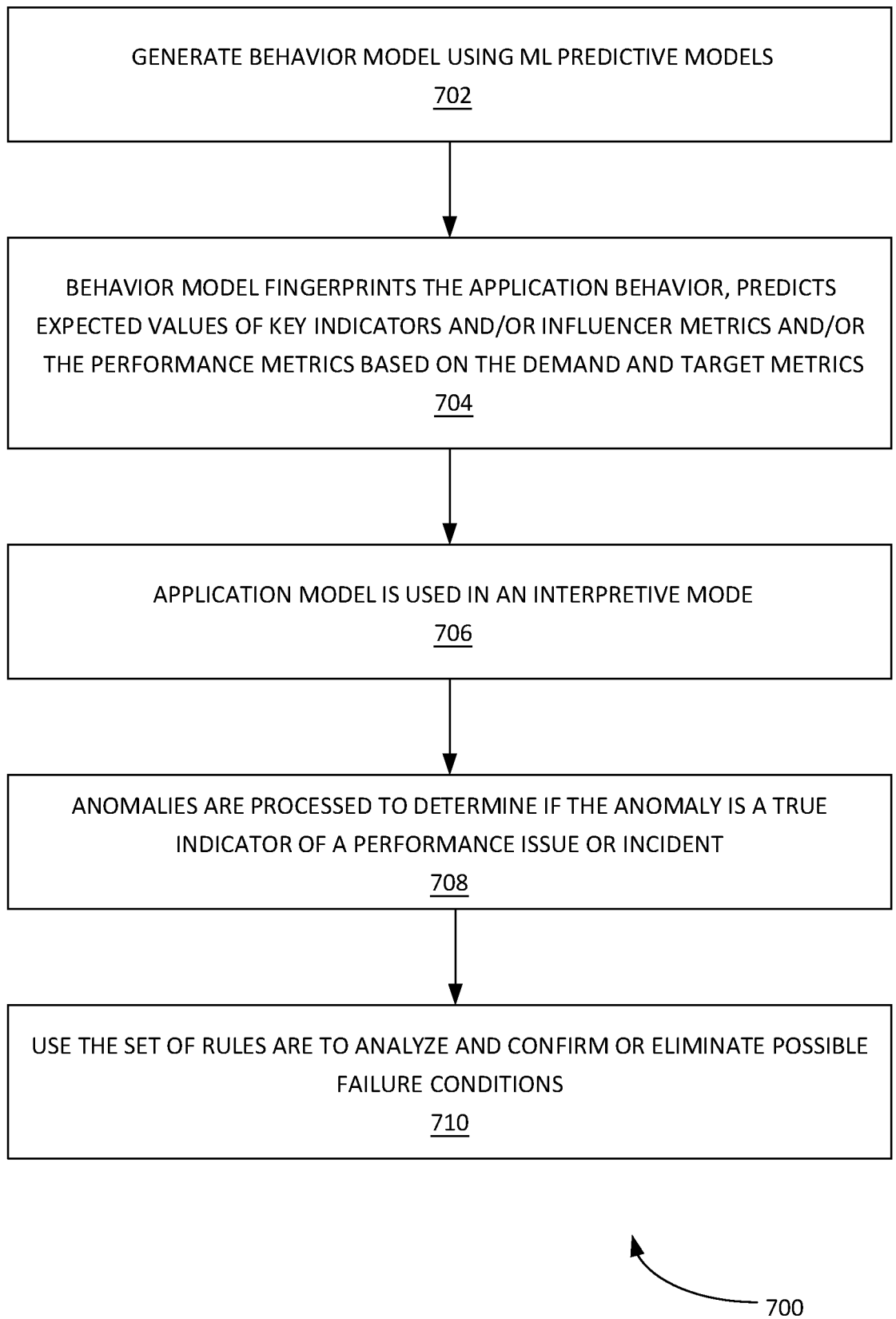
FIG. 7 illustrates an example process for building the application behavior model to detect anomalies, according to some embodiments.

FIG. 7 illustrates an example process 700 for building the application behavior model to detect anomalies, according to some embodiments. Process 700 can be used to build a predictive behavior model for each component, containerized, so it will be used to predictively detect anomalies during operations. Process 700 can utilize the following, inter alia: a behavior model (e.g. using ML to build predictive models); Generic Container Model (GCM) that is the behavior model for a container that executes custom application code (e.g. basis, example prediction in runtime, etc.); a set of known components, (e.g., Elasticsearch, Kafka, etc.); anomaly rules (e.g. from curated knowledge, etc.); a set of explicit errors/events; etc.

More specifically, in step 702, process 700 can generate a behavior model using ML predictive models. To build a predictive understanding of a complete application, process 700 models each component of the application. The model parameters of the component can be based on a priori curated knowledge. This can be a known application (e.g. Kafka, et.) and/or a custom container that implements the customer's proprietary business logic. Using data collected offline, for known components in pre-generated registry (e.g. the known application registry, etc.), and/or in-situ in a runtime environment for custom containers, models are created for each component. For example, a base application behavior model is built around these key set of inputs.

Example inputs can include target metric(s). Target metrics can include a performance metric for the application container (e.g. indexing rate in Elasticsearch) and/or latency in processing an incoming request (L7) for a generic container (GC). Target metrics can be predicted by the model based on observed data during normal (e.g. non-anomaly) conditions.

Example inputs can include demand metric(s). Demand metric(s) can be the independent workload(s) that drive the work done by the container (and/or microservice). Example demand metrics include a number of network requests, a number of HTTP connection requests, a total network bytes arriving at the container, etc.

Example inputs can include influencer metric(s). Influencer metrics can include the subset of all container metrics that are found to influence the target performance besides the demand. Influencer metrics can include be learned either offline under supervised conditions, (e.g. in pre-production, etc.). Influencer metrics can include can be learned in live in production environments. Process 700 can focus on a few specified key metrics that matter in determining the behavior of the application.

An example known application registry is now discussed. It is noted that most microservices applications use a number of known components (e.g. Kafka, ElasticSearch, etc.). The known application registry can model these components and create behavior model templates for each. The model parameters can include known metric, such as, inter alia: target, demand, and influencer metrics, etc.). Accordingly, the model template can then be updated in runtime to reflect the operating cloud environment and infrastructure. This is an example where a priori curated knowledge is used to understand the behavior of the application.

In step 704, the behavior model fingerprints every component of the application in terms of its behavior and predicts expected values of its key indicators, influencer metrics and/or the performance metrics based on the demand and target metrics. Deviations from expected values can be used to indicate possible anomalies in the application. The influencer metrics can also be used as indicators of the health of the applications and are shown in the application map. If there are changes in the behavior of the component due to a configuration change and/or previously unseen conditions, process 700 can trigger retraining and update the behavior model. It is noted that the behavior model for the application is extensible in various aspects that are relevant for known container applications. For example, to obtain more granular information into the application, beyond the node, pod and/or container level, the behavior model can be specific to a database instance and/or an index which can provide more in-depth understanding of an application component where a problem may arise.

Example aspects in building the behavior model can include a model structure. The model structure can include inputs, outputs and variations lead to improved/optimized predictability. The behavior model can develop and/or identify algorithms for building better predictability (e.g. DL/NN vs XGBoost, etc.). The behavior model can improve error thresholds for improvements in, inter alia: reducing false negatives and false positives. The behavior model can identify how labels are obtained for training (e.g. implicit labels, etc.). The behavior model can determine how to extract interpretations from the model so there is better causal analysis in step 508.

It is important to note that anomaly detection can also include explicit errors or unanticipated failures are also detected independent of the learned model of the application. Thus, both rule-based anomalies (e.g., detecting noisy neighbor, etc.), as well as, model-predicted anomalies, are detected and flagged for analysis in this stage. Thus, anomalies in step 806 can be detected via two methods: rule based and/or model prediction. Rule-based detection can capture curated knowledge about the operations of the application and its supporting infrastructure and environment (e.g.

including orchestration, etc.). Model-based prediction can utilize and be based on the learned behavior of the application.

In step 706, after an anomaly is detected, the application model is used in an interpretive mode. Process 700 can use such techniques as LIME (Local Interpretable Model-Agnostic Explanations), to determine which specific influencer metric might have caused the anomaly to occur, the level of deviation from predicted or expected influencer metric values, the level of confidence of the model, etc. These and other metadata and environment conditions are forwarded as labels to the next stage for causal analysis. Furthermore, the model-based anomaly detection can be based on analyzing runtime metrics for predicting deviations in behavior that may be incipient indicators of problems. Process 700 does not solely rely on logs for anomaly detection. Rather, process 700 can use logs and events to confirm the anomaly detection and analyses.

In step 708, Anomalies are processed with more detailed information specific to the spatial and temporal dependence of the container or micro-server on the other components of the application to determine if the anomaly is a true indicator of a performance issue or incident.

In step 710, a set of rules are used to analyze and confirm or eliminate possible failure conditions (e.g. anomaly type, etc.). Examples of general anomaly rules (e.g. see infra) can be used to create anomalies in step 506 and/or besides those that are predicted by the behavior model learned using ML.

Example rules can include a rule for service degradation or failure. This rule can be applied when the underlying services show failure conditions (e.g. either measured or inferred by process 500 or 700 and/or an alert has been detected on an underlying service).

Example rules can include a rule for general node or service configuration issues. This rule can be applied when the configuration of the node and/or its underlying services are misconfigured to handle the workload that was received.

Example rules can include a rule for general noisy neighbor issues. This rule can be applied when the underlying dependent services for the node are impacted by noisy neighbors that share common resources with the node using more than allocated resources. Noisy neighbor conditions can require transitive checking and/or checking a cascade of dependent services.

Example rules can include a rule for workload out of range. This rule can be applied when the workload into the node is out of expected range and/or can be traced to the ingress node (e.g. not due to a change in application update or release, e.g. see infra). This may be default to the configuration mismatch issue (see supra).

Example rules can include a rule for cluster problems. This rule can be applied when the issue is not only in one component of a cluster but across the cluster.

In addition, process 700 can apply application specific rules. An example, application specific rule can include rules for application-specific problems. Known application specific problem indicators can be used to detect performance problems. These are applied when the node is a container that is a known application component (e.g. Kafka, ElasticSearch, Cassandra, etc.). Application specific metrics can be used to determine the occurrence of the problem condition, including incorrect configuration (e.g., Kafka Consumer is exhibiting increased latency because memory allocated for incoming messages was too low).

An example, application specific rule can include rules for application-related performance issues. It is noted that none of the infrastructure and/or dependent services are found to be a problem but changes caused by a new release of the software, detected by CI/CD push notification, is creating performance issues. One way to detect this condition is when the behavior model of the node changes significantly possibly showing increased use of resources and/or calls to other services even when the input workload to the node has not changed outside of the expected range.

An example, application specific rule can include rules for cluster problems. These can be when the issue is not only in one component of an application cluster but across the application cluster. Process 700 can be utilized to implement process 500.

Returning to process 500, in one example, process 500 can build the model offline and/or in the background). A minimal container model can be generated for a generic container. A known container model can be generated as well. Process 500 can detect performance anomaly(s) using these models (e.g. at runtime). Process 500 can check workload demand change(s). Process 800 can post anomaly tickets. Process 500 can implement trigger retraining and/or update the models.

Process 500 can also provide runtime model prediction in step 506. Prediction errors can trigger anomalies on given container(s) Process 500 can analyze predicted errors for clues (e.g. 'labels') on a problem source (e.g. LIME anomaly analysis and down-stage processing demand metrics, resource metrics, internal metrics (e.g. overlay errors for analysis known containers have additional information explicit errors from Kubernetes, containers, resources, etc.).

In step 808, process 800 can implement causal analysis. The causal analysis can be launched whenever any anomaly is detected in step 806. Process 800 can receive all relevant labels and metadata related to the anomaly and the conditions leading to it. The causal analysis is based on a deterministic approach and not on agnostic correlation, and relies on multiple contextual pieces of information. Using the analysis allows process 800 to eliminate false positives, reduce false correlation, significantly reduce the computational overhead, and uncover hard to detect long chain dependencies.

In some embodiments, process 500 can implement game tree traversals on the application graph from an anomalous vertex. Predefined rules can be used for checking a local node. Local dependencies on lower layers can be determined. Termination rules can be implemented. Linked anomalies can be used to eliminate false positives.

In one example, walks (e.g. asynchronous walks, etc.) can be performed through multiple sub-graphs to gather issues and help narrow problem cause(s). A walk is a sequence of vertices and edges of a graph. Process 500 can emit labels that can be utilized in step 510 and 512 infra. The labels can be used to categorize and recommend actions. In this approach game-tree traversals through multiple paths (e.g. breadth, depth, etc.) across the application graph are made to determine if there are existing problems or incidents that might have led to the node that exhibited the anomaly. A path can be terminated due to lack of problem discovery, time or cost. A starting strategy can be set based on a subsystem that the anomaly was detected in. Process 500 can use an enriched anomaly to rule out possible causes. Process 500 identifies root causes and removes new anomalies for each one of the emits labels.

Figure 8:
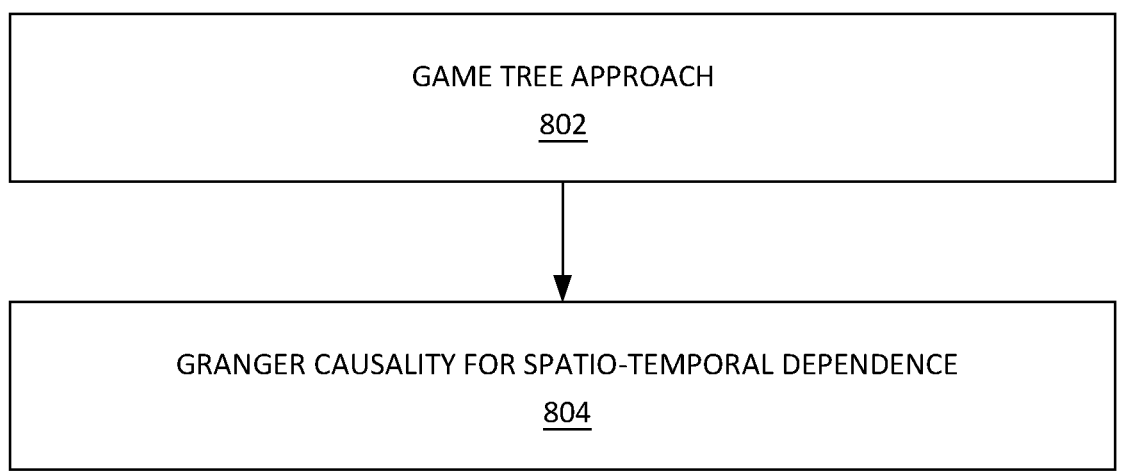
FIG. 8 illustrates an example process for implementing causal analysis, according to some embodiments.

FIG. 8 illustrates an example process 800 for implementing causal analysis, according to some embodiments. Process 00 can be used to implement step 808. Process 800 is launched whenever any anomaly is detected in step 806 and/or by process 700. From step 806 and/or process 700, process 800 can receive relevant labels and metadata related to the anomaly and the conditions leading to it. Causal analysis is based on a deterministic approach and not on agnostic correlation and/or rely on multiple contextual pieces of information. In step 802, process 800 can implement causal analysis using the local anomaly detection at each component. It is noted that causal analysis can be are orthogonal to anomaly detection rules. Process 800 can use the known structure and dependencies both at the Application Map, as well as, the underlying Orchestration Map and Infrastructure Map to determine if the detected anomalous component is the source of the problem, i.e., isolate the problem or fault.

It is noted that one can utilize one or more various causal analysis approaches when developing the application map structure. These can include, inter alia: a Game Tree search or tree traversal; Granger Causality, and/or Canonical Correlation Analysis (CCA), etc.

In step 802, process 800 can use a game tree approach to check upstream and downstream dependencies, since interactions between containers can be bidirectional, for existing anomalies that may have caused the local anomaly. The game tree step can be used to eliminate false positives. The game tree step can be used to reduce the number of possible root causes by explicitly traversing the dependency paths rather than checking all components. The game tree step can be used to reduces false correlation and significantly reduces the computational complexity since the number of paths are far fewer than the number of components. The game tree step can be used to enable process 500 and/or process 800 to discover long-chain dependencies, where the root cause may be multiple hops away from the source of the problem. This can be true when there are stateful components (e.g. Kafka, databases, and search, etc.) which can have highly variable queued states.

Additionally, directional interactions between containers and services can be used. With the use of network flow information, process 800 can find behaviors of a component that are dominated by incoming workload (e.g. upstream) or outgoing workload (e.g. downstream). These also allow process 800 to determine the directionality of the chain dependence and provides more fidelity in isolating root cause. Process 800 can incorporate exploratory graphical causality models, where explicit chained dependencies are derived. This is an area that has not been explored for causal analysis in microservices but appears promising.

More specifically, in one example, the game tree implementation can follow a process similar to using layered game trees using a combination of depth- and breadth-first search; walk down relationships (e.g. edges) from one vertex to another making decisions on which path to take next based on termination rules.

In step 804, process 800 can implement Granger Causality for spatial-temporal dependence. It is noted that Granger Causality can be an optional step and/or utilized to supplement other steps of causal analysis (e.g. supplement that graph walk processes supra, etc.). Process 800 can use extensions of Granger Causality models to create Graphical Causality Networks in the Application Graphs specifically to discover the long chain dependency problems between the connected components in the applications. In this way, process 800 can discover the Graphical Causality Network through Granger Causality Model.

In step 510, process 500 can implement problem classification. Process 500 can classify the anomaly and causal analysis information received from steps 506 and 508 into an existing taxonomy. The taxonomy can include details on the nature of the problem and suggested remediation actions. The classification also uses curated knowledge of typical operations problems and conditions as they relate to failures and incidents that are known to occur in containers as well as known applications. As more varieties of anomalies with different attributes and environmental conditions are added, the problem classification is adapted to address a greater breadth of problem types.

Figure 9:
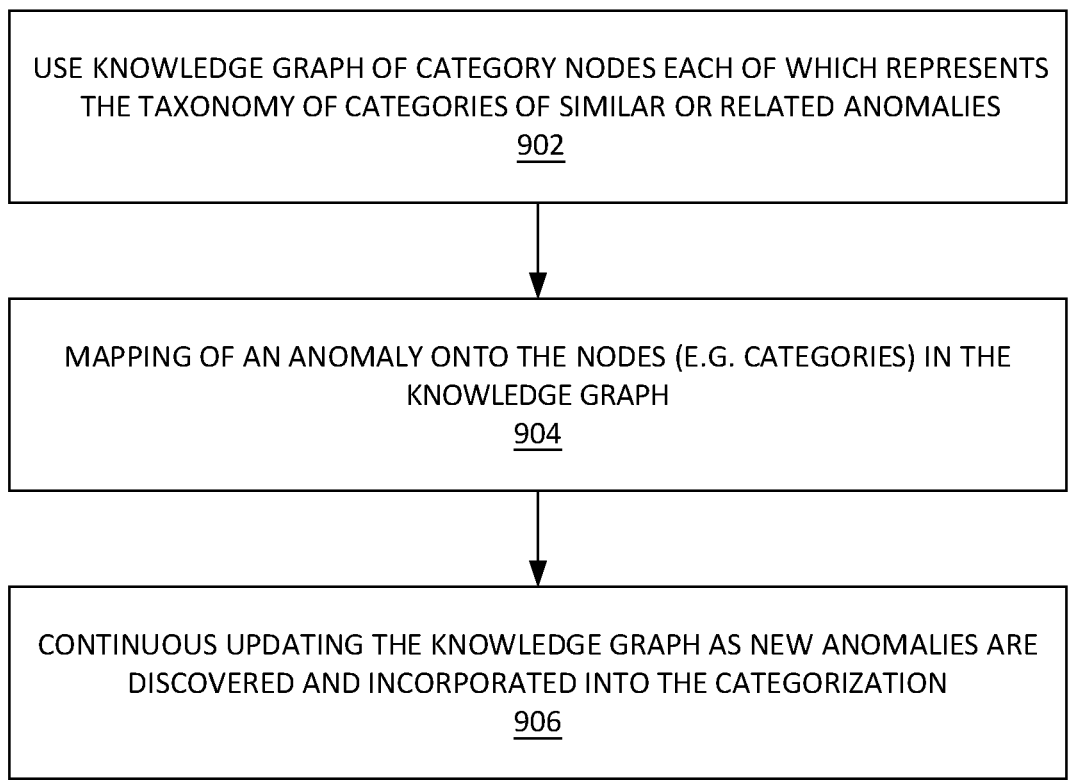
FIG. 9 illustrates an example process for classifying the anomaly and causal analysis information, according to some embodiments.

FIG. 9 illustrates an example process 900 for classifying the anomaly and causal analysis information, according to some embodiments. The anomaly and causal analysis information can be received from steps 506 and 508. The classification can be integrated into an existing taxonomy that has sufficient detail on the nature of the problem. More specifically, in step 902, process 900 uses a knowledge graph of category nodes. Each category node can represent the taxonomy of categories of similar or related anomalies. In step 904, process 900 implements a mapping ('pinning') of an anomaly onto the nodes (e.g. categories) in the knowledge graph. In step 908, process 900 continuously updates the knowledge graph as new anomalies are discovered and incorporated into the categorization.

The knowledge graph can have the following properties. The knowledge graph may not be hierarchical and can have multiple top-level or root-level nodes. For example, these can include labels related to the cloud infrastructure, the application, the type of anomaly such as latency, the severity of the anomaly, etc. Anomalies can belong to different nodes in the knowledge graph as there may be overlapping dimensions. The nodes in the knowledge graph can be defined by expert curation. The curated information can be subjective or 'soft' labels such as the impact of the anomaly. While labels on application, metric values that caused the anomaly are more objective or 'hard' and do not require curation. The knowledge graph may not be fixed as different anomalies that are discovered can change the structure of the knowledge graph. In terms of implementation, the knowledge graph can be represented using a graph database. The mapping of new anomalies into the knowledge graph is a 'pinning' process. There can be multiple dimensions or label sets that can define the knowledge graph nodes and can include but not limited to: anomaly subject, anomaly syndrome, impact.

In step 512, process 500 can implement recommendations for remediation. Step 512 provides recommended actions based on the problem classification of step 810 510. It is noted that a problem can be described in terms of details on the anomaly entity and its operating environment. The problem can be associated with a related remediation action that may make necessary changes to the configurations, resources, services, etc. The recommendation can be forwarded to the DevOps team (e.g. via an incident management system such as, inter alia: PagerDuty® or ServiceNow®, etc.). Once the action has been executed (e.g. see step 514 infra), and the results are noted in the incident management system, the efficacy of the recommendation is recorded. A closed loop feedback action can be taken to improve the recommendation.

Figure 10:
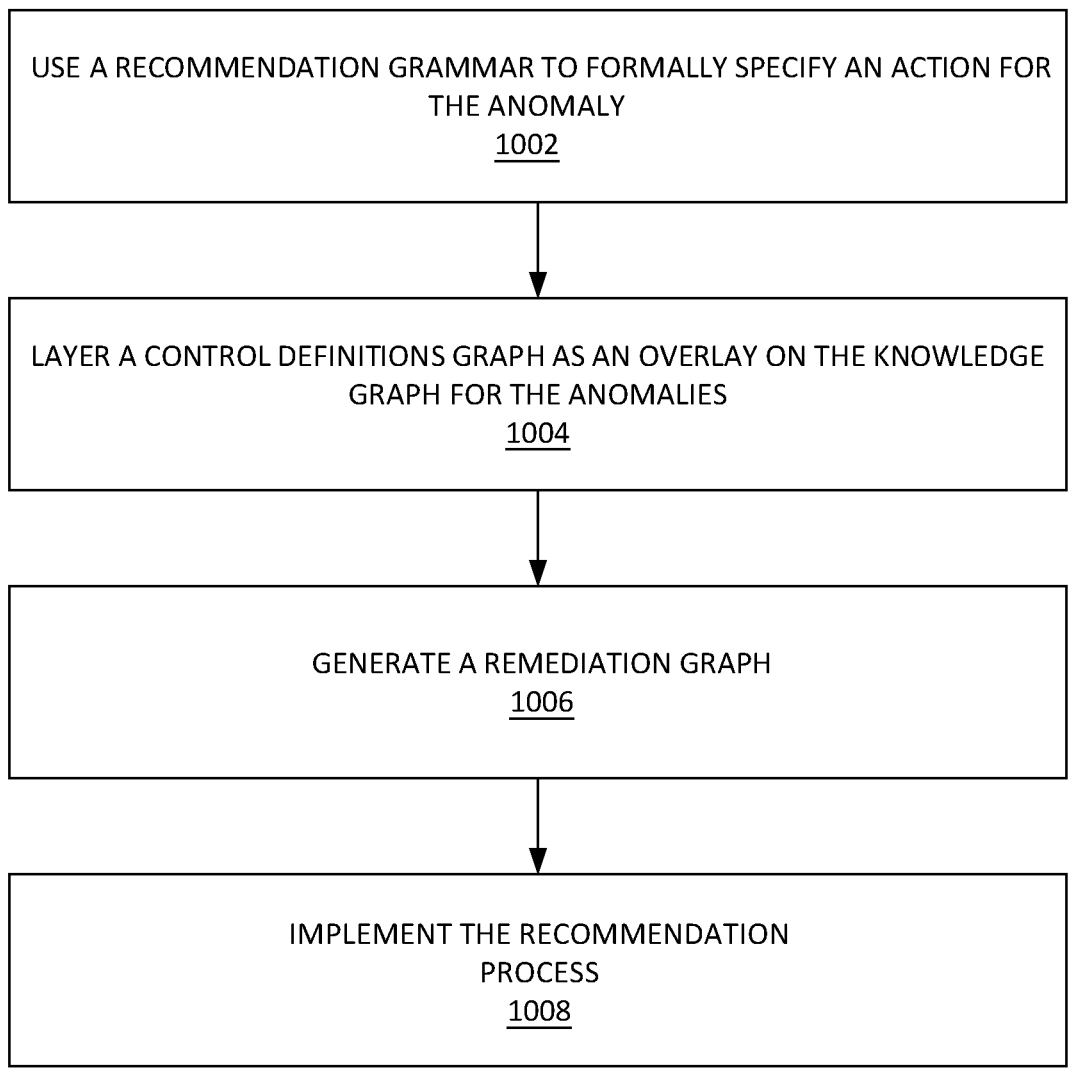
FIG. 10 illustrates an example process for recommending actions based on the problem classification, according to some embodiments.

FIG. 10 illustrates an example process 1000 for recommending actions based on the problem classification, according to some embodiments. As each problem is decomposed into details on the anomaly entity and its operating environment, process 1000 can associate a related remediation action that may make changes to the configuration, resources and/or services at the application component, orchestration or infrastructure layers. In relation to the anomaly categorization, process 1000 generates a recommended action(s) for a pinned anomaly in the knowledge graph.

More specifically, in step 1002, process 1000 uses a recommendation grammar to formally specify an action for the anomaly. In step 1004, process 1000 layers a control definitions graph as an overlay on the knowledge graph for the anomalies. Process 1000 provides a graph of vocabulary of control elements of each application and its components. In step 1006, process 1000 generates a remediation graph. The remediation graph illustrates relationships between elements of pinned anomalies to control knowledge graph vertices. In step 1008, process 1000 implements the recommendation process. This can be done using an automated analysis of incoming pinned anomaly from step 510 with the data from steps 506 and/or 508, and compose a recommendation expression.

Process 1000 takes a knowledge-based approach by incorporating application and the anomaly environment knowledge. Process 1000 leverages the knowledge graph from 510 and/or process 900, in terms of capturing the actual anomaly complexity, including the structure of the environment besides the anomaly details. To associate the action used for remediation, process 1000 creates an overlay on the control elements. However, the control graph can specify the control variables. Additionally, the efficacy of the control action taken in the actual control step, is used to update the control graph including any feedback provided by the human operator.

Process 1000 uses a recommendation language and/or grammar that specifies the problem entity or the subject that is at the center of the anomaly, the action that is needed on the entity, and the specific object that is the control element or setting on which the action is to be taken. Using this formal syntactic representation enables process 1300 to generalize the recommendation actions for any class of problem incidents.

In step 514, process 500 can implement actions. The action is the actual execution of the recommended action for remediation. Because actions to be taken can be dependent on the organization's process and policies, the action can be mapped to the organizations' operations runbook. Additionally, when there are constraints, the action execution can be implemented as an optimization solution. The relevant organization can then manage and implement their own action plan. Step 514 can utilize the remediation graph to implement actions.

Figure 6:
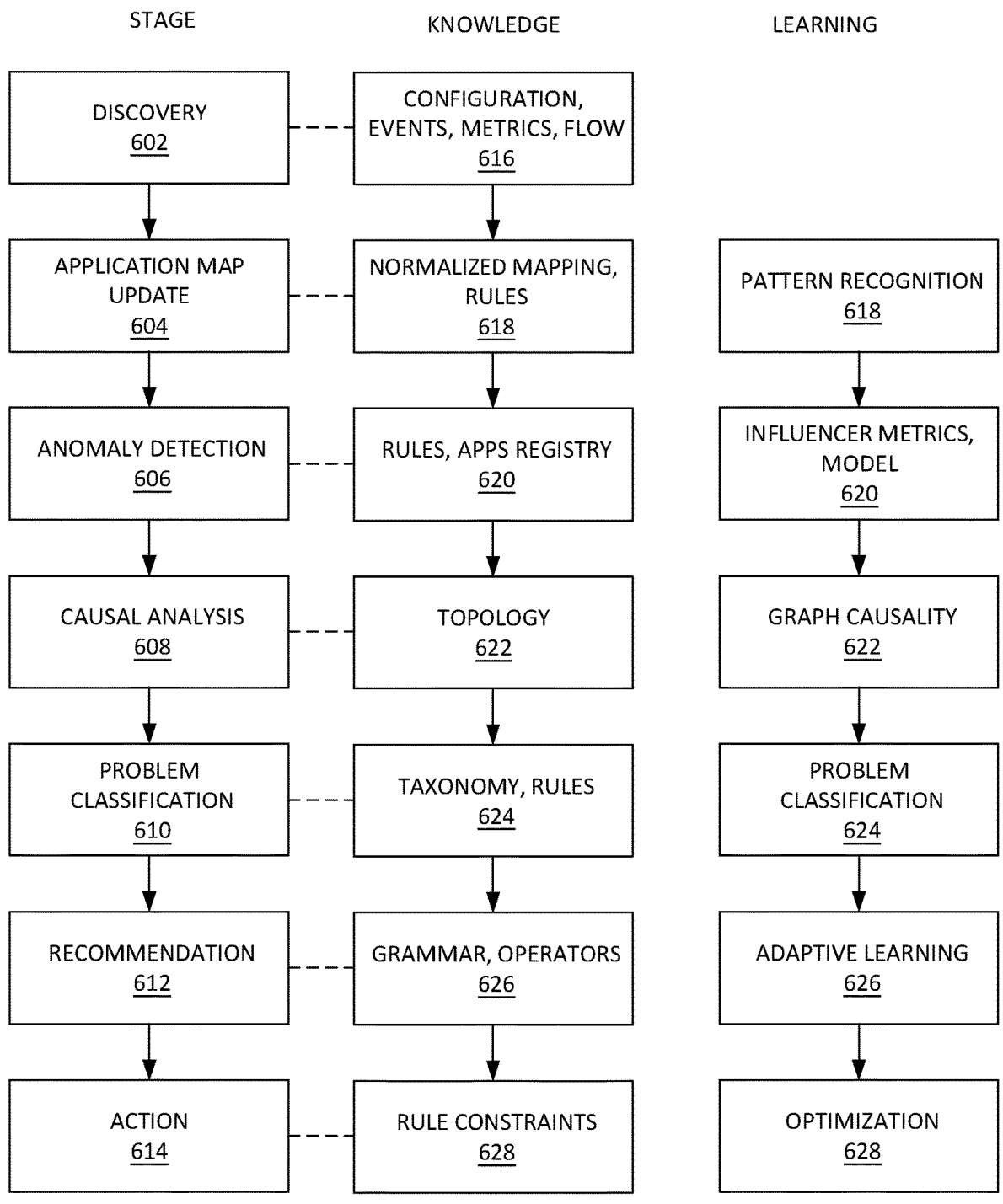
FIG. 6 illustrates a process for contextual processing within a multi-stage pipelined analysis, according to some embodiments.

FIG. 6 illustrates a process 600 for contextual processing within a multi-stage pipelined analysis, according to some embodiments. Process 600 can be utilized to implement process 500. Process 600 uses the knowledge 616-628 learned by steps 502-514 of FIG. 5. Knowledge 616-628 is then applied to learnings 630-640. As shown, the processing done in each stage of the pipeline of steps 502-514 uses a combination of curated knowledge 616-628 specific to the stage and the appropriate machine learning (ML) techniques as needed for the objectives for that stage as shown. It is noted that step 618 can utilize various algorithmic approaches updating the application map besides pattern recognition when developing the application map structure. These can include, inter alia: Granger Causality and/or Canonical Correlation Analysis (CCA), etc. Additional learning/applied knowledge discovery techniques can be utilized (e.g. clustering analysis, NLP, statistical methods, etc.).

More specifically, process 900 can use microservices applications that are complex, heterogeneous, and dynamic distributed system. There can be used to create a model-based control system based on the multi-step sequence of processing of FIG. 8. Each step/stage poses a different problem statement and has a different solution as provided supra. The multi-stage analytics and processing can be deployed in pipeline mode, beginning from the initial processing of the data sent by the data gateways from the application environment in step 802 to the execution of any necessary remediation action in step 514. The objective of each stage is to gain progressively increasing visibility into the internal state of the application across its components so that processes 500 and 600 can detect, analyze, and isolate an incident and its cause and then determine the required corrective action.

Additional implementations of process 500 are now discussed. Process 500 can provide can include extensibility of the solution and use in capacity planning. Process 500 can be applied to general microservices applications and is not restricted to applications that are comprised only of containers, but include both SaaS and serverless components. Containerized application models can have more explicit visibility and control over their orchestration and infrastructure metrics. Their models can include configuration settings and allocation of resources at both levels, and thus provide a more granular control on their performance. Process 800 can also model the performance of non-orchestrated components but because SaaS and serverless components are not orchestrated, there are fewer choices in managing their configurations (e.g. memory allocated and timeout specified in an AWS Lambda function, and therefore expose less granular control).

Process 800 can provide capacity planning for scale. The application model can provide first-order insights into the required infrastructure as the application is scaled. The basis for the planning is estimating the resource and service demands from the behavior model of all application components.

Process 500 can provide ease of deployment. Process 500 can provide for deployment of the data collection that is designed to have minimal impact on the existing operations environment. It creates no application impact since the gateways are deployed as pods in the monitoring plane with simple container installation process consistent with that used by Ops to deploy other containers. The collection code are simple open Go code that Ops can inspect. The gateways pull data from existing Prometheus servers, Kubernetes and cloud monitoring APIs, using another container orchestration instead of Kubernetes, etc.

Process 500 can be used for managing security. The data collected by the gateways are operational metrics do not contain payload that may have PCI or PHI concerns. No secrets are transmitted to the SaaS. In addition, the DevOps team can have full control over metrics or names that they feel are sensitive and can anonymize or remove by setting filters.

Process 500 can be cloud agnostic. The SaaS use by process 500 can be cloud agnostic and, therefore, does not depend on whether the organization is running on public cloud or on-premise. The only requirement is that the application containers are orchestrated by Kubernetes.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for managing autonomous cloud application operations comprising:
providing a cloud-based application;
implementing a discovery phase on the cloud-based application, wherein the discovery phase comprises ingesting data from the cloud-based application and building an application graph of the cloud-based application, wherein the application graph represents a structural topology and a set of directional dependencies and relationships within and across the layers of the cloud-based application;
with the application graph, implementing anomaly detection on the cloud-based application by:
building a set of predictive behavior models from an understanding of the complete application using a priori curated knowledge and one or more machine learning (ML) models, and wherein the set of predictive behavior models fingerprints a behavior of the components that comprise the cloud-based application behavior, and predicts expected values of key indicators; and
detecting one or more anomalies in the cloud-based application;
implementing causal analysis of the one or more detected anomalies, wherein the causal analysis:
receiving a set of relevant labels and a set of metadata related to the one or more detected anomalies, and the structure of the application graph and generating causal analysis information and fault isolation; and
implementing problem classification by classifying the one or more anomalies and causal analysis information into a taxonomy, wherein the taxonomy comprises a set of details on the nature of the problem, and
automatically implementing the remediation actions to change the behavior of one or more components to restore the performance service levels of the application; and
receiving a set of relevant labels related to the one or more anomalies, the causal analysis information as related to the taxonomy, and the control action information associated with the anomaly within the taxonomy.

2. The computerized method of claim 1, wherein the application graph captures a structure of the cloud-based application such that the application graph comprises all the components of the cloud-based application across a set of layers of the cloud-based application.

3. The computerized method of claim 2, wherein the set of layers of the cloud-based application comprises an application layer, an orchestration layer, and a cloud-infrastructure layer.

4. The computerized method of claim 3, wherein the application graph captures a structure of the cloud-based application such that the application graph comprises a set of cloud-based application connectivity that represents a set of directional dependencies of the cloud-based application.

5. The computerized method of claim 4, wherein the application graph is updated in real-time with a set of most recent metrics and event data for each entity across all three layers.

6. The computerized method of claim 5, wherein the orchestration layer comprises Kubernetes-based layer.

7. The computerized method of claim 5, wherein the causal analysis is implemented using the structure and the set of dependencies of the application graph.

8. The computerized method of claim 5, wherein the causal analysis is implemented using an application graph of the cloud-based application to determine that a detected anomalous component is a problem source of the cloud-based application.

9. The computerized method of claim 8, wherein the causal analysis is implemented using an Infrastructure Map of the cloud-based application to determine that the detected anomalous component is the problem source of the cloud-based application.

10. The computerized method of claim 1, wherein the anomaly is detected by both set of predictive behavior models and set of curated rules.

11. The computerized method of claim 1 further comprising:
implementing an action that comprises an execution of the set of remediation actions.

12. The computerized method of claim 1, wherein the application graph is built using an application configuration and a set of specified application metrics.

13. The computerized method of claim 12, wherein the application graph is built using an application network flow, an application trace, and an application events.

14. The computerized method of claim 1 further comprising:
recommending a set of remediation actions.

* * * * *